(12) United States Patent
Majkut et al.

(10) Patent No.: US 7,243,138 B1
(45) Date of Patent: Jul. 10, 2007

(54) TECHNIQUES FOR DYNAMIC RULE-BASED RESPONSE TO A REQUEST FOR A RESOURCE ON A NETWORK

(75) Inventors: Keith Majkut, Foster City, CA (US); Vivek Sharma, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 730 days.

(21) Appl. No.: 10/146,335

(22) Filed: May 14, 2002

Related U.S. Application Data

(60) Provisional application No. 60/353,270, filed on Feb. 1, 2002.

(51) Int. Cl.
*G06F 15/16* (2006.01)
*G06F 17/30* (2006.01)

(52) U.S. Cl. .................. 709/219; 709/229; 707/10; 707/3

(58) Field of Classification Search ........... 709/229, 709/226, 225, 203, 201, 223, 219; 713/201, 713/202; 715/700; 707/10, 3
See application file for complete search history.

(56) References Cited

U.S. PATENT DOCUMENTS

| | | | |
|---|---|---|---|
| 6,360,262 B1 * | 3/2002 | Guenthner et al. | 709/226 |
| 6,408,336 B1 * | 6/2002 | Schneider et al. | 709/229 |
| 6,453,353 B1 | 9/2002 | Win et al. | 709/229 |
| 6,574,663 B1 * | 6/2003 | Bakshi et al. | 709/223 |
| 6,717,588 B1 * | 4/2004 | Miller et al. | 715/700 |
| 6,772,350 B1 * | 8/2004 | Belani et al. | 713/202 |
| 6,785,728 B1 | 8/2004 | Schneider et al. | 709/229 |
| 6,886,100 B2 | 4/2005 | Harrah et al. | |
| 6,892,307 B1 * | 5/2005 | Wood et al. | 713/201 |
| 6,901,428 B1 * | 5/2005 | Frazier et al. | 709/203 |
| 6,920,475 B1 * | 7/2005 | Klots et al. | 709/201 |
| 2002/0194211 A1 * | 12/2002 | Subramanian et al. | 707/500 |
| 2003/0018786 A1 * | 1/2003 | Lortz | 709/226 |
| 2003/0050966 A1 * | 3/2003 | Dutta et al. | 709/203 |
| 2003/0065774 A1 * | 4/2003 | Steiner et al. | 709/225 |
| 2003/0074580 A1 | 4/2003 | Knouse et al. | 713/201 |

OTHER PUBLICATIONS

U.S. Appl. No. 10/146,620, filed May 14, 2002.
Keith Majkut and Vivek Sharma, "Implementing a Lightweight Web Server for Resource Pooling and Scalability," Java Developer's Journal, SYS-CON Publishing, vol. 5, Issue 10, Oct. 2000, 18 pages.

(Continued)

*Primary Examiner*—Jungwon Chang
(74) *Attorney, Agent, or Firm*—Hickman Palermo Truong & Becker LLP

(57) ABSTRACT

Techniques for responding to a request for a resource on a network include receiving at a server the request from a client process for the resource. The server transmits a set of request information items associated with the request. In response to this transmission, a database server receives at least a subset of the set of request information items. Within the database server, at least one particular request information item of the subset is used as a key to identify a routine. The routine is executed to generate a set of access information items. The server responds to the request based on the set of access information items. Using these techniques, the server responds to the request differently without taking the server offline, by changing the routine indicated within the database server.

35 Claims, 9 Drawing Sheets

OTHER PUBLICATIONS

"J2EE Users, Realms, and Groups," The J2EE Tutorial, http://java.sun.com/j2ee/tutorial/1_3-fcs/doc/Security9.html#65369, printed Apr. 6, 2002, 3 pages.

"J2EE(tm) Developer's Guide," ttp://java.sun.com/j2ee/j2sdkee/techdocs/guides/ejb/html/Security2.html, downloaded Apr. 6, 2002, 109 pages.

"Statement of Facts Relating to Non-commercial Use of Certain Techniques," 10 pages.

"Authentication," J2EE™ Developer's Guide, file://C:\WINDOWS\TEMP\J2EE™ Developers Guide.htm, printed Apr. 8, 2002, pp.1-3.

U.S. Appl. No. 10/146,620, filed May 14, 2002.

"Statement of Facts Relating to Non-commercial Use of Certain Techniques," Sep. 4, 2002, 10 pages.

\* cited by examiner

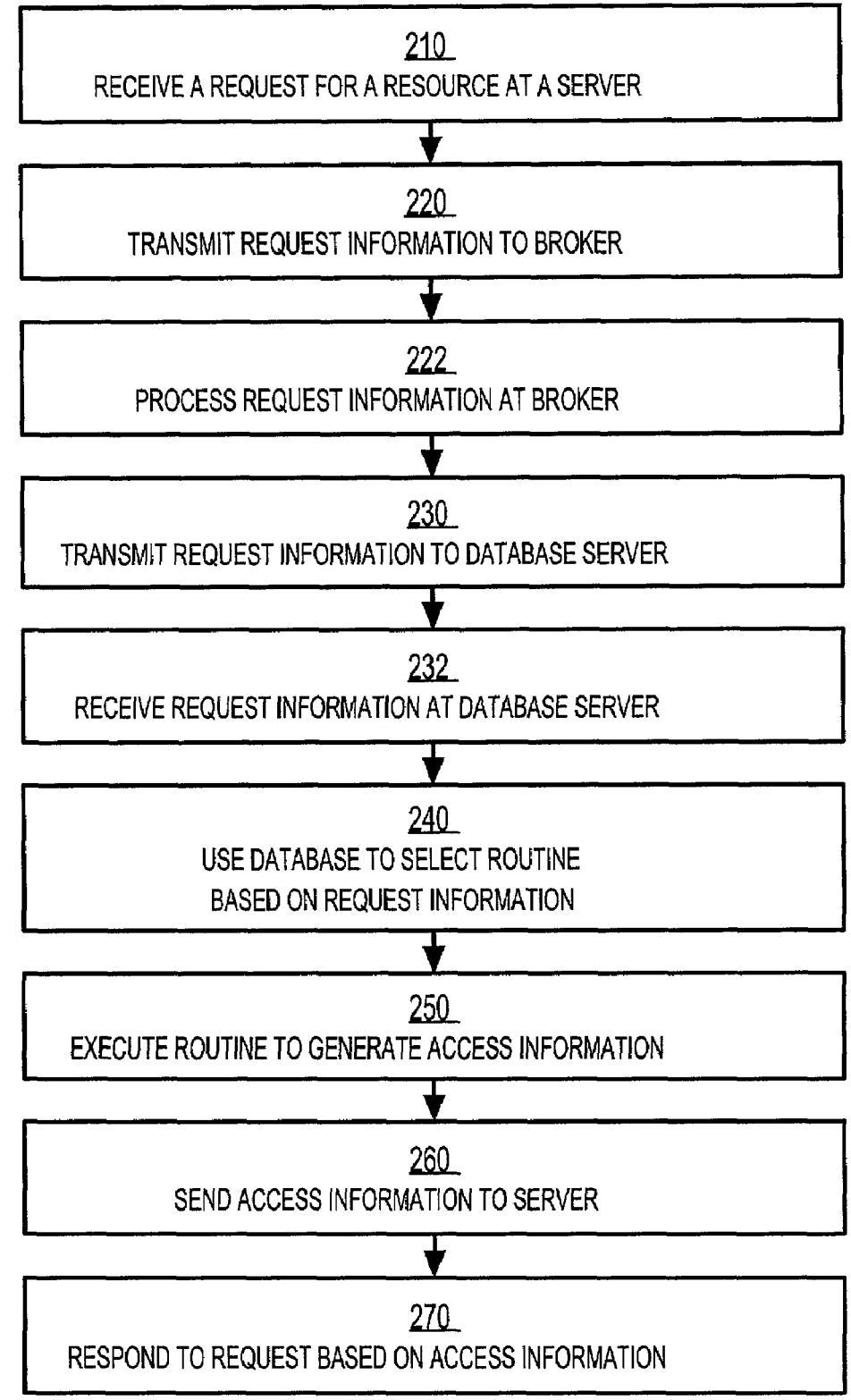

310
FORM A TABLE IN A DATABASE WITH A RULE ID COLUMN AND WITH A SET OF COLUMNS OF REQUEST INFORMATION SERVING AS A KEY

320
STORE IN THE TABLE MULTIPLE RULE IDs ASSOCIATED WITH CORRESPONDING SETS OF VALUES FOR THE KEY

330
BASED ON THE NEXT REQUEST INFORMATION DETERMINE A NEXT SET OF VALUES FOR THE KEY

340
RETRIEVE A NEXT RULE ID FROM THE TABLE USING THE NEXT SET OF VALUES AS A KEY

350
INVOKE A RULE ASSOCIATED WITH THE NEXT RULE ID

360
CHANGE A RULE?
YES / NO

362
FORM A NEW RULE WITH A NEW RULE ID TO ASSOCIATE WITH A PARTICULAR SET OF VALUES FOR THE KEY

364
UPDATE THE TABLE WITH THE NEW RULE ID IN A ROW WITH THE PARTICULAR SET OF VALUES FOR THE KEY

510
PROVIDE A USER INTERFACE FOR FORMING A RULE, WHICH INTERFACE::
  PRESENTS REQUEST INFORMATION DEFINITIONS
  PRESENTS ACCESS INFORMATION DEFINITIONS
  ACCEPTS A RULE ID
  ACCEPTS VALUES FOR A PARTICULAR SET OF
    REQUEST INFORMATION USED AS A KEY FOR AUTOMATIC EXECUTION
  ACCEPTS COMMANDS FOR DERIVING ACCESS INFORMATION
    INCLUDING PULL DOWN MENUS FOR SPECIFYING
      REQUEST INFORMATION,
      OPERATIONS ON REQUEST INFORMATION,
      ACCESS INFORMATION.

↓

520
ACCEPT ADMINISTRATOR INPUTS

↓

530
GENERATE CODE WHICH CAN BE EXECUTED TO APPLY THE
RULE FORMED

↓

540
STORE THE CODE FOR AUTOMATIC RETRIEVAL AND EXECUTION
BASED ON A VALUE FOR
THE PARTICULAR SET OF REQUEST INFORMATION

TECHNIQUES FOR DYNAMIC RULE-BASED RESPONSE TO A REQUEST FOR A RESOURCE ON A NETWORK

CLAIM OF PRIORITY

This patent application claims domestic priority under 35 U.S.C. § 119(e) from prior Provisional Application No. 60/353,270, filed on Feb. 1, 2002, entitled "RULE BASED SECURITY SYSTEM," and naming as inventors KEITH MAJKUT and VIVEK SHARMA, the contents of which are incorporated herein by reference for all purposes.

CROSS REFERENCE TO RELATED APPLICATION

This application is related to application Ser. No. 10/146,620, filed May 14, 2002, entitled "Techniques for Generating Rules for a Dynamic Rule-based System that Responds to Requests for a Resource on a Network," and naming as inventors KEITH MAJKUT and VIVEK SHARMA, the contents of which are incorporated herein by reference for all purposes.

FIELD OF THE INVENTION

The present invention relates to providing resources over a network; and, in particular, to providing dynamic, rule-based responses to requests for a resource.

BACKGROUND OF THE INVENTION

Networks are widely used to connect computer systems to each other. Computer systems execute one or more processes. Those processes typically implement components of software "applications." For the purpose of explanation, the computer system or device that is executing a particular process or application shall be referred to as the "host" of that process or application.

In some arrangements, the applications are equals, called "peers," which perform the same functions and which mutually control communications among themselves. In a widely used alternative arrangement, an application running on one host, such as a personal computer or handheld device, is called a client process. The client process requests services from another application called a server process. The server process is often executing on a different host or hosts that have substantially more computing power than the device on which the client is executing.

The term "client" is often used to refer to either the client process (software) or the host (software/hardware) for the client process. To avoid confusion, the term "client" shall be used herein to refer to the host unless otherwise indicated. Similarly, the term "server" is often used to refer to either the server process (software) or the host (software/hardware) for the server process. To avoid confusion, the term "server" shall be used herein to refer to the host unless otherwise indicated.

Organizations providing one or more services on one or more servers may not want to provide the same service to every user of every client making a request. For example, some resources may be intended only for persons associated with the organization and not for the general public.

One solution for preventing access to a resource by a user of a client process who is not an intended user is an authentication mechanism built into the server process. The authentication mechanism challenges the user of the client process to enter a user identification and password. If the user provides the correct identification and password, the user's client is allowed to access the resources provided by the server process. If not, the user's client is denied access.

One problem with this approach is that a particular server may host several server processes, and the authentication process may have to be built into each one. If an authentication process becomes out of date, for example because an authorized user has left the organization, the changes have to be made at all the authentication processes.

Another problem with this approach is that the response is very unsophisticated, providing a simple two-state, "yes" or "no" response. Either the user of the client process is who the user claims to be and is allowed access to all resources provided by the server process; or the user is not, and is denied access to all resources. This is not always satisfactory. An organization providing the server may want the client processes of some users to be denied access, some to be given access to some resources, and others to be given access to other resources. A process providing such multi-valued responses is called "authorization." For example, a hardware retailer may want to authorize no documentation for some users, marketing materials for other users, user documentation for existing customers, and detailed specifications for technicians troubleshooting equipment in the field. Different users have different authorizations.

One solution for providing an array of different response to multiple requests for the same resource is to use plug-in modules that can be executed on the servers and that can be customized to provide particular behavior by the server processes.

One problem with this approach is that the plug-in modules are managed separately on each host on which it is installed. If an organization has connected several hosts to the network to handle the number of requests expected, the plug-in module has to be installed on each host. The different hosts may be different platforms that use different combinations of hardware and operating systems. In such circumstance, the plug-in module and installation process might have to be modified for each platform combination. In addition, every time the behavior is modified, changes have to be made for each platform, and the appropriate changes have to be installed on each host. Maintaining consistent behavior across multiple hosts acting as servers becomes burdensome and prone to error.

Another problem with conventional plug-in modules is that one plug-in module handles all requests for all resources at each server. Therefore, to provide individualized response to each request, the module can become exceedingly complex and computationally intense. In many instances, the module is kept manageable by limiting the number of different responses.

The problem of complex modules is exacerbated because some plug-in modules are implemented so that a separate instance of the module is executed for each request received by each server. For services that are intended to be provided to hundreds and thousands of clients, computational resources consumed by hundreds or thousands of instances of complex plug-in modules can be excessive and accelerate the degradation of performance observed at the servers with increasing numbers of clients.

Furthermore, many plug-in modules can only be changed by removing the active plug-in module through commands manually issued at the server, and inserting the new plug-in module through additional commands manually issued at the server. This sequence of commands makes both versions of the plug-in module unavailable for a period of time during the change. Making both versions of the plug-in module unavailable for a time essentially takes the behavior provided by the plug-in modules offline for a while, producing a gap in the behavior offered by the plug-in modules. Sometimes the server application itself, or an entire suite of server applications using the plug-in module, becomes unavailable during the change of plug-in modules, rendering the server unresponsive for a period of time. Such a gap in behavior is often unacceptable on a server that receives requests at a high rate for most times of the day.

Based on the preceding description, there is a clear need for customized responses to requests for resources that alleviate or avoid these problems.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

Techniques for responding to a request for a resource on a network include receiving at a server the request from a client process for the resource. The server transmits a set of request information items associated with the request. In response to this transmission, a database server receives at least a subset of the set of request information items. Within the database server, at least one particular request information item of the subset is used as a key to identify a routine. The routine is executed to generate a set of access information items. The server responds to the request based on the set of access information items.

In embodiments of this technique, the server responds to the request differently without taking the server offline.

An advantage of using a database server to store data that identifies a routine is that the response can be modified without taking the server offline, since many database servers allow changes to contents of the database without taking the database offline.

Another advantage of using the database server to store data that identifies the routine is that modifications to responses of several servers controlled by an organization can be made at a single location, in the database, and immediately and consistently change the behavior of all the servers.

In embodiments in which the routine executes on a different platform from the servers, the computational load on the servers is reduced. Furthermore, such embodiments allow each routine to execute on a single platform, i.e., one combination of operating system and hardware, even if the servers are made up of an array of different platforms. This reduces the effort expended to generate new routines to provide new responses that are uniform across multiple platforms acting as servers.

In embodiments in which many routines are indicated in the database, the complexity of each routine is reduced from that of a single plug-in module that provides all behaviors for all requests. Therefore, the computational load to run each instance of one routine is substantially less than the load to run the single but complex plug-in module.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flowchart illustrating at a high level a method for forming a rule-based response to a request for a resource;

FIG. 3 is a flowchart illustrating a method for using a database according to an embodiment of a step of the method of FIG. 2;

FIG. 5 is a flowchart illustrating at a high level a method for administering rule-based responses to requests for resources;

DETAILED DESCRIPTION OF THE PREFERRED EMBODIMENT

A method and apparatus for responding to a request for a resource on a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In particular, embodiments of the invention are described in the context of a web site including multiple web servers providing web pages and other resources in response to requests from web clients. In this context, the web is the World Wide Web, which is a collection of servers called web servers that provide data in the form of Hyper-Text Markup Language (HTML) pages, called web pages. The HTML pages are transmitted over networks, such as the Internet, using the Hyper-Text Transfer Protocol (HTTP). A web site is a group of one or more web servers that provide the same set of web pages. A web client, also called a web browser, or simply a "browser," presents the web pages to a user. HTML, HTTP and the World Wide Web are well known in the art of network communications. Many web servers and browsers are also configured to transmit and receive other resources, such as files, using other transport protocols, such as the file transport protocol (FTP). However, the invention is not limited to web sites of web servers providing web pages and files to web clients, but can be applied to other resources provided by other servers to other clients.

Structural Overview

Figure 1:
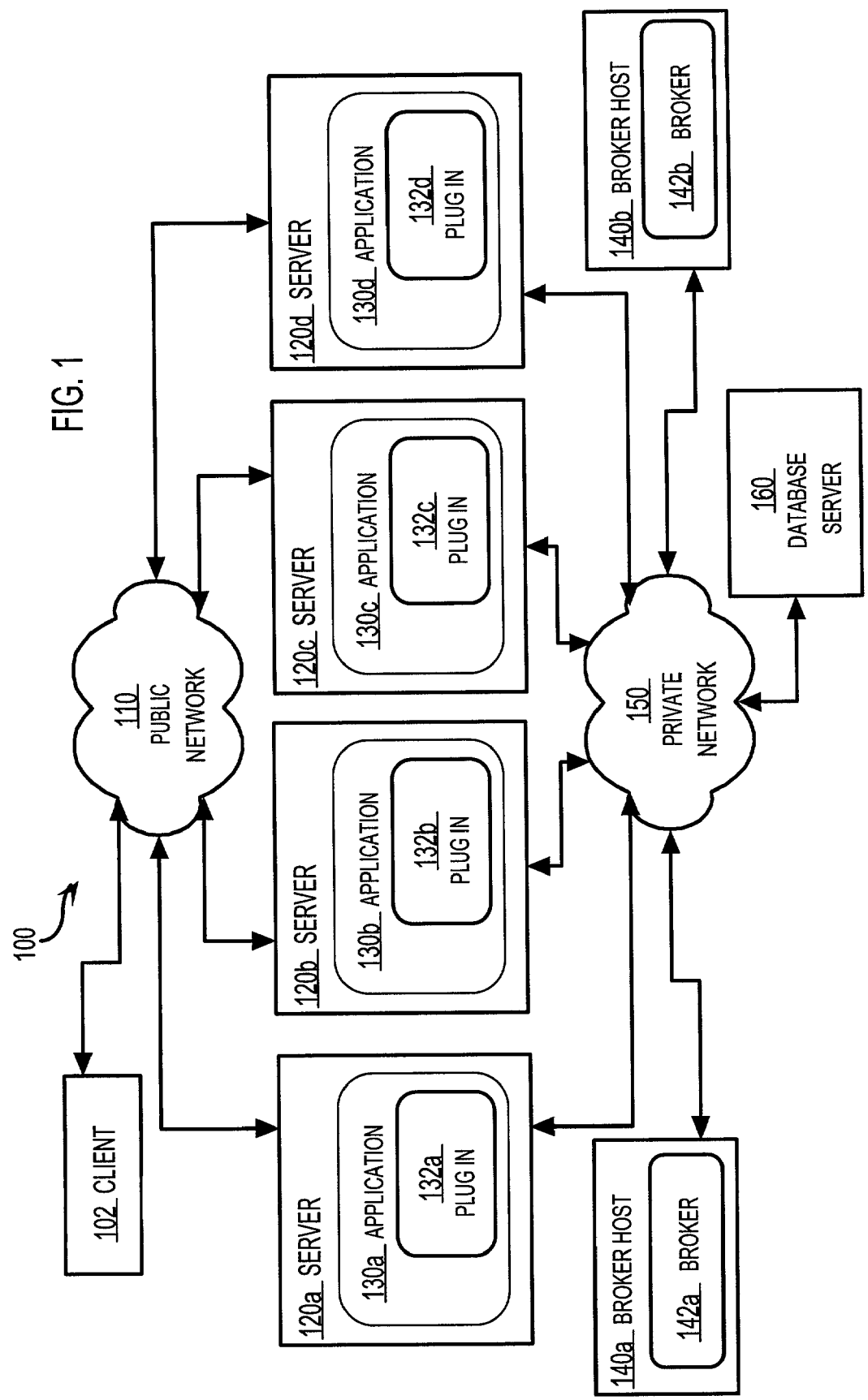
FIG. 1 is a block diagram illustrating a system of servers responding to requests for resources according to an embodiment.

FIG. 1 is a block diagram illustrating a system of servers responding to requests for resources according to an embodiment. One or more web sites are hosted by web servers 120a, 120b, 120c, 120d, collectively referenced as web servers 120. The servers are connected to public network 110, such as the Internet. In other embodiments, public network 110 may be replaced by a private network such as a private wide area network (WAN) or local area network (LAN). The servers are also connected to a private network 150 not exposed to the public, such as a private wide area network for an organization. The private network may be made up of direct links among the hosts, or may include one or more networking devices such as switches, hubs, routers, and gateways. The servers 120 may communicate with each other over public network 110 or over private network 150. In some embodiments, the private network 150 is omitted and the servers communicate only over the network 110.

Applications 130a, 130b, 130c, 130d, collectively referenced as applications 130, execute on servers 120a, 120b, 120c, 120d, respectively, to provide web pages associated with one or more of the web sites of the organization. To provide authentication for various requests for web pages, the applications 130a, 130b, 130c, 130d invoke plug-in modules 132a, 132b, 132c, 132d, respectively, which are collectively referenced as plug-in modules 132.

According to the illustrated embodiment, the plug-in modules perform a small number of operations and delegate much of the computation for customized responses to other hosts connected to network 150. In particular, the plug-in modules 132 delegate at least some of the computation for customized responses to a database server 160, described below.

A client 102 is also connected to public network 110. A browser executing on client 102 makes a request for a web page or some other resource from one of the web sites hosted by servers 120. The request is directed over the public network 110 to one of the servers 120. In some embodiments one of the servers 120, or a different host (not shown) connected to the network 110, performs load balancing to distribute requests among servers 120 according to some loading policy. Any mechanism known in the art for load balancing may be used.

A database server 160 for the organization is connected to private network 150. The servers 120 communicate with the database server 160 over the private network 150. In embodiments without the private network 150, the database server 160 is connected to the network 110, and servers 120 communicate with the database server over network 110.

According to the illustrated embodiment, the database server 160 maintains a database that is used to indicate different routines based on a set of one or more properties of the requests from the clients. The different routines provide each server's different response behaviors to the different requests. The response to a particular request can be changed simply by using the database to indicate another routine for the same values of the set of properties for the request. Neither the plug-in modules 132 nor the applications 130 need to be changed or brought offline. Furthermore, a single change in the database effects a uniform change among all servers 120 for responding to requests with particular values for the set of properties. Using the database server 160, customized responses to requests for resources are generated that alleviate or avoid several problems of conventional responses.

In the illustrated embodiment, two broker hosts 140a, 140b, collectively referenced as broker hosts 140, are also connected to private network 150. In other embodiments, more or fewer broker hosts, including no broker hosts, are connected to private network 150. Broker processes 142a, 142b, collectively referenced as broker processes 142, execute on broker hosts 140a, 140b, respectively. Each broker process 142 manages a pool of connections to the database server 160. In the illustrated embodiment, the broker processes 142 perform other computations for customized responses, described in more detail in a later section. Although depicted with one broker process per broker host, in other embodiments, several separate processes executing on each broker host may perform the functions ascribed below to a broker process. In embodiments with broker hosts but without the private network 150, the broker hosts 140 are connected to the network 110. In such embodiments, the servers 120 communicate with the broker hosts over network 110, and the broker processes 142 manage connections over network 110 with the database server 160.

It is assumed, for purposes of illustration, that web sites OrgMarketing and OrgTechnical for organization Org are hosted by web servers 120 so as to distribute the load and reduce the number of network hops between one client and one server. For example, requests from clients in Europe and Africa are directed over the Internet to web server 120a located in Europe; requests from clients in Canada and the eastern United States (U.S.) are directed over the Internet to web server 120b located in the eastern U.S., requests from clients in South America and the western U.S. are directed over the Internet to web server 120c located in the western U.S., and requests from clients in Australia and Asia are directed over the Internet to web server 120d located in Asia. If the load on one web server 120 becomes too great, or if it experiences hardware problems, requests are directed to one or more other web servers 120 according to the loading policy. For example, if web server 120a experiences a power failure, then requests from Europe and Africa are directed to web servers 120b and 120d.

In this example, one database server 160, for purposes of illustration assumed to be co-located with the server 120c in the western U.S., indicates the routines that provide the behavior for at least some requests received by all servers 120. When such a request is received at any web server 120, the plug-in module 132 sends request information to database server 160 over network 150. The database server selects a routine to execute based on the request information. The selected routine is executed and the results passed as access information back to the plug-in module that sent the request information. Based on the access information, the plug-in module 132 responds to the request.

The illustrated embodiment alleviates or avoids several problems of conventional approaches for customized responses. For example, the routine may be executed on a different host from the server, alleviating excessive consumption of computational resources on the server. In addition, different routines can be indicated for different groups of requests so each individual routine is not as complex as a single plug-in module that is executed for all requests. Dividing response behavior among several routines reduces the complexity of each routine and reduces the computational resources consumed by any one routine for one request. Further, the centralized database always points to a most current version of the routine to be executed, no matter which server received the request, so all servers are simultaneously up-to-date.

Functional Overview

FIG. 2 is a flowchart illustrating at a high level a method 200 for forming a rule-based response to a request for a resource. Though the steps of FIG. 2 and other flowcharts are shown in a particular order, in other embodiments the steps may be performed in a different order or overlapping in time.

For purposes of illustration, it is assumed that a particular directory of web pages called "documentsT," on the OrgTechnical web site, is used to download technical manuals intended only for dissemination to technicians in the field. The organization Org wants different responses to different requests for web pages in this directory. In particular, the organization Org wants in-house employees not to download documents from the directory during peak usage hours.

It is further assumed that a routine named "RoutineA" is developed, which compares a user identification ("user ID") to a list of user IDs of field technicians and compares an IP address of the client to ranges of IP addresses, called "subnets," associated with hosts of the organization Org. If the user is an authenticated technician not on the Org subnets, access is granted to the web page in the directory. If the client IP address is on the Org subnets and the time is a peak usage time, the request is redirected to another web page inviting the user back at an off-peak time. If the IP address is not on the Org subnets and the user ID of an authenticated user is not on the list of technician user IDs, the request for the web page is denied. The routine RoutineA is to be executed for every request for the web pages in the documentsT directory of the OrgTechnical web site, but is not to be executed for requests to different web pages.

In step 210, a request is received at a web server for a web page on a web site. A web page is indicated according to a Universal Resource Location (URL) address. The URL consists of a domain name to indicate a host, followed by an optional hierarchy of directories and a resource file name. The elements of the URL after the domain name, and after the port, if present, constitute the Universal Resource Identifier (URI).

The request also includes information for use by the server process receiving the request, some of which is part of the URL. Such additional information includes any of such information as a referring URL that listed the URL of the request, data input to HTML forms, and input arguments for a program expressed in a scripting language, among other information well known in the art.

The web page request that includes the URL and other information is delivered in a data packet. A header of the data packet includes other information for network and transport protocols, such as the Transmission Control Protocol (TCP) and Internet Protocol (IP), used to route the data packet with the request, and a data packet for a response, across the network to the correct process on the correct host. The TCP/IP information includes the IP address of the client (the source of the data packet), a source port indicating a particular process executing on the client that sent the request, such as a channel of the browser, the destination IP address (e.g., the IP address of server 120a), and the destination port indicating the application on the server (e.g., application 130a on server 120a).

For example, a request is received at server 120a for a web page listed as a link on a home web page of the OrgTechnical web site. The original request may have been directed to a URL made up of domain "OrgTechnical.com" and URI "/documentsT/DeviceXYZ.htm." A load balancing component on the network converts the domain name to the IP address of one of the servers 120, such as 120a, that has a different domain name, such as "OrgServer1.com." So the request may arrive with the URL:

"OrgServer1.com/documentsT/DeviceXYZ.htm."

Thus, the URL received at the server does not indicate a portion of the information "OrgTechnical," in the original website. This portion of the information is called the "program name" hereinafter. The program name of the website each server 120 supports is a property of the server and is stored by each server in a file local to the server, such as a server configuration file.

During step 210, the application 130 extracts request information about the request, including the program name, for transmission to another host on private network 150. In the illustrated embodiment, the request is passed to the plug-in module 132, which extracts the request information for transmission to the other host. Any plug-in module known in the art may be used to extract the request information and transmit it over the private network 150. For example a plug-in module provided in the APACHE website-development package is used to extract the request information and transmit the request information over the private network 150. APACHE is an organization that promotes open source software; information about APACHE software may be obtained at the time of this writing on the World Wide Web at domain "apache.org."

The application, sometime through the plug-in module, if any, later responds to the request based on access information received over the private network 150 in response to the request information transmitted over the private network 150. The access information and the response by the plug-in module are described in more detail below with reference to step 270.

In some embodiments, the application, sometimes through the plug-in module, performs one or more other operations in response to receiving the request. For example, the plug-in module may generate a response to requests for cancelled web pages or resources without regard for any access information received over the private network 150. In the illustrated embodiment, the plug-in module challenges the user of the client to enter a user ID and password, before the plug-in module transmits the request information.

In the illustrated embodiment, the request information is sent to one of the broker hosts 140 which manage connections to the database server 160. In an embodiment without the broker hosts 140, the plug-in module 132 establishes a connection with the database server 160 and transmits the request information over that connection directly to the database server. The extracted request information is made up of values for one or more request information variables. More details on request information variables are described in a later section with reference to Table 3.

In step 220, request information is transmitted to a broker process 142 on one of the broker devices 140. Step 220 is omitted in embodiments without broker hosts 140. To avoid outages, two broker hosts 140 are connected to the private network 150 in the illustrated embodiment. If a broker process 142 on one broker host 140 is offline, the request information sent by the plug-in module is transmitted over network 150 to the other broker host. For example, if broker host 140a loses power, the request information is transmitted to broker host 140b for use by broker process 142b.

In step 222, a broker process 142 receives and uses the request information. The broker manages a pool of connections to a database on the database server 160, as described in more detail in a later section, or determines whether to send any of the request information to the database server, or both. In some embodiments, the broker process performs one or more other operations during step 222 in response to receiving the request information from the server, as described in more detail in a later section. In embodiments without broker hosts 140, step 222 is omitted.

In step 230, the request information is transmitted to the database server 160. In some embodiments, the broker process 142 invokes a stored procedure in the database and passes some or all of the request information as arguments for the stored procedure. In some embodiments without broker hosts 140, the application 130 or the plug-in module 132 on the server 130 transmits the request information to the database server 160.

In step 232, the request information is received at the database server. In the illustrated embodiment, the stored procedure begins executing with the request information.

In step 240, the database is used to select which routine to execute. The selected routine generates the access information used by the application 130 or its plug-in module 132 to respond to the request. More details on how the database is used to select the routine, according to an illustrated embodiment, are described in a later section with reference to FIG. 3.

In the illustrated embodiment, the database includes a routine-selection table associating the directory "/documentsT" of web site "OrgTechnical" with data indicating routine RoutineA such as the name "RoutineA." The stored procedure extracts the values of directory "/documentsT" and web site "OrgTechnical" from the request information. The stored procedure then uses the web site and directory as a key to select from the routine-selection table the name "RoutineA."

In step 250, the selected routine is executed to generate access information. The access information indicates to the application, or its plug-in module, how to respond to the request. More detail on access information is described in a later section with reference to Table 1. In some embodiments, the selected routine is itself a stored procedure in the database on database server 160. In other embodiments, the selected routine resides on a different host, such as a broker host, that is invoked through a remote procedure call.

In the illustrated embodiment, the stored procedure invokes RoutineA, passing some or all of the request information to RoutineA. For purposes of illustration, RoutineA is assumed to be a stored procedure in the database. As described above, RoutineA compares a value of a user ID from the request information to a list of user IDs of field technicians and compares an IP address of the client from the request information to subnets associated with hosts of the organization Org. If the user is an authenticated technician, based on the user ID and a password from the request information, and is not on the Org subnets, access is granted to the web page in the directory. If the IP address is not on the Org subnets and the user ID of an authenticated user is not on the list of technician user IDs, the request for the web page is denied. If the user is not an authenticated user, then the request for the web page is also denied. For purposes of illustration, it is assumed that the client IP address is on the Org subnets and the time is a peak usage time, so that the request should be redirected to a different web page inviting the user back at an off-peak time.

In the illustrated embodiment, RoutineA provides only some of the behavior of the servers. The response behaviors to other requests are provided by other routines. Thus each instance of RoutineA is substantially less complex and computationally intensive than would be each instance of a single plug-in module that provided all the behaviors for all the responses. Therefore the computational load on the system 100 is substantially reduced by using the method 200 in place of executing an instance of a single plug-in module for each request received by each server.

Furthermore, a stored procedure invoked by some database servers, such as the Oracle™ database server of Oracle Corporation, resides in shared memory so that different requests invoking the same stored procedure may use the same instance of the stored procedure in shared memory. Execution of stored procedures in shared memory avoids launching a separate instance of the procedure for each request. Therefore the computational load on the system 100 is reduced even further by using the method 200 in place of executing an instance of a single plug-in module for each request received by each server.

In step 260, the access information is sent to the server. The access information indicates how the server 120 should respond to the request from the client 102. For example, access information indicating the request should be redirected to the different web page is sent to the plug-in module 132*a* on server 120*a*.

In step 270, the server responds to the request based on the access information. For example, the plug-in module 132*a* redirects the request to the different web page, based on the access information received in step 260.

Response Information Variables

Table 1 lists access information variables included in the access information, according to an illustrated embodiment. In other embodiments, fewer or additional access information variables are included, or multiple listed variables are combined into a single variable, or a listed variable is split into multiple variables.

TABLE 1

Access information variables for an illustrated embodiment.

| No. | Name of variable | Description of variable |
|---|---|---|
| 1 | authorized | variable indicating whether the user will get to the resource requested. One value ("true" or "1") indicates the user is authorized to get the requested resource; a second value ("false" or "0") indicates the user will not get the requested resource. |
| 2 | doRedirect | variable indicating whether to send the user to the URL in the redirectURL variable, which is different than the resource requested. One value ("true" or "1") indicates the user is redirected to a different resource; a second value ("false" or "0") indicates the user will not be redirected to the different resource. |
| 3 | redirectURL | variable indicating the different URL to which the user is to be sent if so indicated by the doRedirect variable. |

The values of the access information variables provide sufficient information for an application 130, or its plug-in module 132, to respond to a request for a resource during step 270, described above. For example, a simple set of instructions in the plug-in module can form a response during an embodiment of step 270 based on the variables in Table 1. Table 2, lists pseudo-code instructions that indicate one way in which a plug-in module would use the access information variables with numeric values for variables authorized and doRedirect. Such a plug-in module can be substantially less complex than a module that provides all response behaviors for all requests.

TABLE 2

Instructions to use access information variables in an illustrated embodiment.

| Line number | Pseudo-code instruction |
|---|---|
| 1 | if authorized is 0 |
| 2 | then ( |
| 3 |     if doRedirect is 1 |
| 4 |         then [ redirect request to URL = redirect URL ] |
| 5 |         else [ send a response that user is not authorized for resource ] |
| 6 | ) |
| 7 | else ( |
| 8 |     if doRedirect is 1 |
| 9 |         then [ redirect request to URL = redirect URL ] |
| 10 |         else [ direct request to originally requested resource ] |
| 11 | ) |

According to the pseudo-code in Table 2, if the value of the variable authorized is zero, indicating the user is not authorized for the requested resource, then the instructions in lines 2 through 6 are followed. Otherwise, the instructions in lines 7 through 11 are followed. In lines 2 through 6, it is first determined whether the value of the doRedirect variable is 1, indicating that the request will be redirected. If so, the request is redirected to the URL stored in the variable redirect URL, according to the instruction in line 4. If not redirected, a response that denies the request for the resource is sent to the client. In lines 7 through 11, it is first determined, again, whether the value of the doRedirect variable is 1, indicating that the request will be redirected. If so, the request is redirected to the URL stored in the variable redirectURL, according to the instruction in line 9. If not redirected, the requested resource is sent to the client.

Request Information Variables

Table 3 lists request information variables included in the request information, according to an illustrated embodiment. In other embodiments, fewer or additional request information variables are included, or multiple listed variables are combined into a single variable, or a listed variable is split into multiple variables. In the illustrated embodiment, the plug-in module extracts values for the request information variables of Table 3 from the data packet that includes the request received by the server 120 and from the server configuration file. The plug-in module also challenges the user for values for the username and password variables (variables 1 and 2 in Table 3). Such a plug-in module that extracts the request information from the request and challenges the user for values for a username and password would be substantially less complex than a module that provides all response behaviors for all requests

TABLE 3

Request information variables for an illustrated embodiment.

| No. | Name of variable | Description of variable |
|---|---|---|
| 1 | username | username entered as part of a challenge |
| 2 | password | password entered as part of a challenge |
| 3 | serverProtocol | requested protocol to be used by the server to transmit the requested resource to the client (e.g., "http:" for web pages, "ftp:" for files, etc.) |
| 4 | serverHost | portion of the URL that gives the domain name of the server which received the request |
| 5 | serverPort | port number of the server application that received the request |
| 6 | uri | portion of the URL after domain name |
| 7 | queryArgs | stream of URL arguments when requestMethod = GET |
| 8 | filePath | absolute path of the requested resource in the file system, including the filename. |
| 9 | referedByURL | URL that referred the client to the currently requested URL |
| 10 | clientIp | client IP address |
| 11 | userAgent | client agent from whatever process is making the request (e.g., browser, web crawler) |
| 12 | requestMethod | POST or GET; indicating how data associated with the request is passed from client to server |
| 13 | remoteHost | the client host name if reverse domain name service (DNS) is turned on |
| 14 | cookies | string of all cookies stored on client for requests to the web site of this server |
| 15 | language | client language from whatever process is making the request (e.g., browser, web crawler) |
| 16 | formData | stream of URL arguments when requestMethod = POST |
| 17 | extraData | reserved for future use |
| 18 | programName | name that distinguishes one website hosted by some servers from a different website hosted by other servers. |

In embodiments in which the plug-in module does not challenge the user to enter a user ID and password, the request information variables username and password are empty when the request information is passed to the broker from the plug-in module. If the broker process challenges the user for values of these variables, then these variables are not empty when the request information is passed to the database server. In embodiments in which the plug-in module does not challenge the user, and the broker process does not challenge the user or there is no broker process, then these variables are empty when the request information is passed to the database server. In some such embodiments, the database server challenges the user for values for these variables; in other such embodiments no attempt is made to authenticate the user.

In the illustrated embodiment, all the request information in Table 3 available at the plug-in module is passed to the broker host for at least some requested resources; and all the request information in Table 3 available at the broker host is passed to the database server, for at least some requested resources.

Method for Using Database to Select Rules

FIG. 3 is a flowchart illustrating an embodiment 240*a* for using a database in step 240 of method 200 illustrated in FIG. 2.

In step 310, a routine-selection table is formed in a database on database server 160. The routine-selection table is defined to include a key of one or more columns corresponding to information in one or more request information variables. The routine-selection table is also defined to include at least one column indicating a rule identification ("rule ID"), such as a column identifying, by name, a stored procedure or a procedure in a stored package of procedures. The routine-selection table is used to determine which routine of multiple routines to run based at least in part on information in the request information variables. In some embodiments, the key columns are constrained to form a unique key. The same routine may be used in multiple rows of the routine-selection table.

For example, a routine-selection table name rst is defined with a key made up of two columns. A first column named site holds data that indicates a web site for which responses are to be determined by a routine. The data in column site corresponds to data stored in the request information variable programName (variable 18 in Table 3, above) A second column named directory holds data that indicates a directory of one or more resources for which responses are to be determined by an associated routine. The data in column directory corresponds to data stored in the request information variable uri (variable 6 in Table 3, above). The table rst is defined to also include a column called routineName, which indicates the name of a routine to be executed to determine a response to requests for resources at the site and directory indicted in the key columns. The rst table is used to determine which routine to run based on the web site and directory of the requested resource. In other embodiments, other routine selection tables are defined that are used to determine which routine to run based on other information in the request information variables extracted from the request.

In step 320 data are stored in the routine-selection table indicating multiple routines, each routine associated with one set of values for the one or more columns of the key. For example, the routine name "RoutineA" is stored in column routineName in one row of the table rst. In the same row, associated with RoutineA, the value "OrgTechnical" is stored in column site and the value "/documentsT/" is stored in the column directory. In other rows of table rst, other values are stored in columns site or directory, or both, and are associated with other routines or RoutineA in column routineName. Table 4 lists a few rows of the rst table for an illustrated embodiment.

TABLE 4

Example rows of a routine-selection table rst for an illustrated embodiment.

| site (first key column) | directory (second key column) | routineName (rule ID) | |
|---|---|---|---|
| OrgMarketing | /documentsT/ | RoutineX | ... |
| OrgMarketing | /documents/images/ | RoutineY | ... |
| OrgTechnical | /documentsT/ | RoutineA | ... |
| OrgTechnical | /documents/images | RoutineY | ... |
| ... | ... | ... | ... |

In this embodiment, the first two columns represent the two components of the key. The third column holds the rule ID associated with each key value, which, in the illustrated example, is the stored procedure name. Note that the same routine may be associated with different values of the key. For example, RoutineY is associated with the key values in the second and fourth rows of the rst table. The ellipsis in the last column of Table 4 indicates one or more additional columns in the example routine-selection table. For example, in other embodiments the additional columns may hold data indicating the language of the routine, whether the routine is compiled or not, a remote host for the routine, if any, and whether the routine is applied only to resources in the directory listed in the directory column or is applied recursively to all subdirectories of the directory listed in the directory column. The ellipses in the last row of Table 4 indicate one or more additional rows in the example routine-selection table.

In the illustrated embodiment, step 240a overlaps in time with steps 210 through 232 of FIG. 2, so that steps 310 and 320 may be performed before request information is received at the database server in step 232.

In step 330 a set of one or more values for the routine-selection table key are determined based on the request information. For example, the value "OrgTechnical" is extracted from the data in the request information variable programName, and the value "/documentsT/" is extracted from the data in the request information variable uri. In some embodiments, only resources in the directory named in the directory column are associated with the routine. In such embodiments, the value for the directory column component of the key is the last directory named in the uri variable. In some embodiments, resources in the directory named in the directory column and resources in all subdirectories of the named directory have responses determined from the associated routine. In such embodiments, one or more trial values for the directory column component of the key are determined based on the directories in the uri variable, starting from the leftmost directory in the uri variable.

In step 340, a rule ID is retrieved from the routine-selection table based on the set of values for the key. For example, the name "RoutineA" is retrieved from the rst table row that has the values "OrgTechnical," "/documentsT/" in the key columns site, directory.

In step 350, the rule associated with the rule ID is invoked. As a result of the invocation of the rule in step 350, a routine is executed during step 250 to generate the access information, as described above.

For example, the database server invokes a stored procedure named RoutineA. In other embodiments, the database server invokes the procedure named RoutineA in a stored package of multiple procedures. In still other embodiments, the database server does a remote procedure call to a routine named RoutineA on another host, such as on a broker host 140 or on server 120a or some other server 120.

Step 360 represents a decision point at which a web site administrator for the organization determines to change a rule to produce a different response to one or more requests for resources at the web site. For example, step 360 is performed when the administrator inputs data to an administration tool indicating a change in responses to requests for resources. If no such input is received, control passes back to step 330 to determine a next set of values for the key based on the next request information received at the database.

If it is determined in step 360 that a change to a rule is to be performed, then control passes to step 362 to form a new rule with a new rule ID to associate with a particular set of values for the set of key columns for the routine-selection table. Any manner for forming a new rule may be used, such as programming, in any programming or machine language, a new routine to generate access information based on request information. More details on forming a new rule according to an illustrated embodiment are given in a later section with reference to FIG. 5 and FIGS. 6A through 6E.

For example, a new routine named "RoutineB" is developed to change the responses made to requests for resources in directory /documentsT/ of web site OrgTechnical. The changes involve redirecting a request to one of multiple pages, depending on the language used by the client process. In some embodiments, in which the change determined in step 360 does not involve forming a new rule but instead associates an existing rule with a different set of values for the key, step 362 is omitted.

In step 364, the routine-selection table is updated to associate a different rule ID with a particular set of values for the key, or to associate the same rule ID with a different set of values for the key, or to associate a new rule ID with a different set of values for the key. For example, the routine-Name column of the third row of table rst listed in Table 4 is updated to associate the values of "OrgTechnical," "/documentsT/" of the key columns site, directory, respectively, with the different routine named "RoutineB." The following columns of the same row in the rst table, which give other properties of the routine, may also be updated.

During step 364, according to the illustrated embodiment, neither the plug-in modules 132, nor the applications 130, nor the servers 120 are brought offline during the update of the routine-selection table in the database. Thus, according to this embodiment, the servers 120 are not brought offline to change the behavior of the responses made by the servers 120 to requests for resources, thereby avoiding a problem with conventional approaches.

In the illustrated embodiment, step 240a overlaps in time with steps 250 through 270 of FIG. 2, so that steps 362 and 364 may be performed after the server has responded to an earlier request during step 270.

Using a Broker for Connections to the Database

As described above with respect to step 222, a broker process 142 receives and uses the request information in some embodiments. In the illustrated embodiment, the broker process manages a pool of connections to a database on the database server 160 and determines whether to send any of the request information to the database server over one of the connections.

A database on a database server is often configured to operate with a limited number of connections. It takes a substantial amount of time for a host to establish a connection with the database. For example, in some embodiments it takes one or two seconds to establish a database connection. An advantage of the broker process 142 is that a pool of connections can be established before requests are received so that there is no latency in passing the request information to the database server due to establishing the connection. Although pools of connections could be established by the application 130 or plug-in module 132 on each server 120, such an approach suffers several disadvantages. One disadvantage is that establishing and managing pools of connections at each server 120 increases the computational load on what may be an already heavily-loaded server. Another disadvantage is that establishing pools of connections at the servers 120 may result in too many connections for some servers and not enough connections for others, thus squandering valuable and scarce connections.

In some embodiments, one or more broker processes on each broker host performs one or more other operations, besides managing a pool of connections. For example, the broker process may generate access information for some requests, such as in response to a request for deleted resources, without sending the request information to the database server 160. In some embodiments, the broker process challenges the user of the client to enter a user ID and password, instead of having the plug-in module challenge the user. After receiving the user ID and password, in such embodiments, the broker process then sends request information, including the user ID and password, to the database server 160.

In some embodiments, the broker host is configured to enhance the performance of certain tasks, such as processing audio or video data, or for compiling certain languages, such as Java. In such embodiments, response behavior determinations that involve the certain tasks are made by one or more processes on the broker hosts.

Distributing Rules Over Multiple Layers

Processes, such as routines that are executing, on a server 120 are said to be on a "local layer" of the system; processes on a broker host 140 are said to be on a "middle layer" of the system; and processes on the database server 160 are said to be on a "database layer" of the system. In some embodiments, not all the responses to requests for resources are performed by routines selected using the database server 160. Instead, responses to some requests for resources are determined by one or more routines executed on one or both of the server 120 and the broker host 140, i.e. by processes on the local layer or on the middle layer or both. Such embodiments distribute the rules for responding to requests over multiple layers of the system.

For example, some simple responses to requests for some resources might well be performed on the local layer. Such simple responses include allowing all requests for particular resources, and denying all requests for resources that are not provided by the organization. In some embodiments, challenging the user for a user ID and password, or redirecting the request to a server that challenges the user for the user ID and password, are simple parts of a response that are already often performed on the local layer.

Some responses to requests for some resources might well be performed on the middle layer. For example, if the middle layer is especially configured for certain tasks, such as interpreting commands in a particular language, such as Java, or processing audio or video data, then responses that rely on performing those certain tasks might well be performed on the middle layer.

Figure 4:
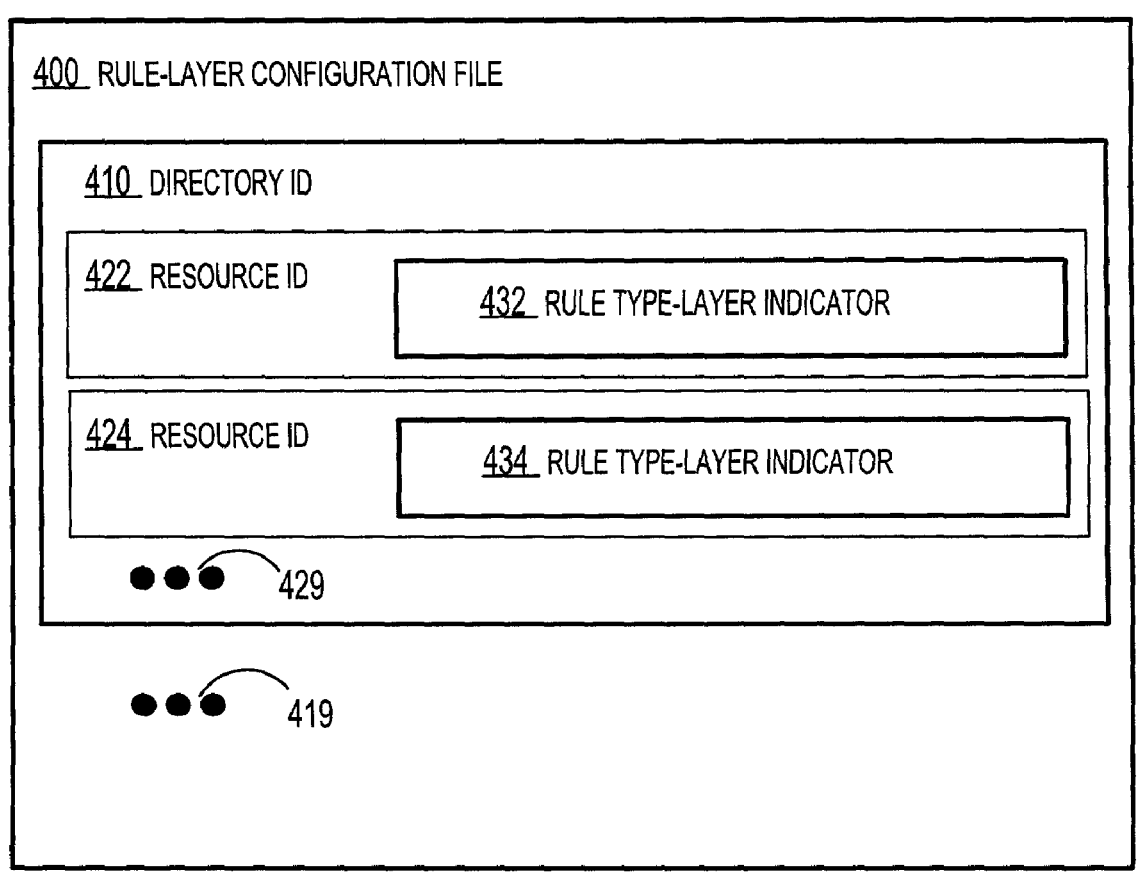
FIG. 4 is a block diagram illustrating a configuration file for distributing rules among multiple layers of the system of FIG. 1, according to an embodiment.

According to an illustrated embodiment, some response behaviors to some requests for resources are performed on the local layer, or on the middle layer, or both. In order that the system can determine where a response behavior is determined, a rule-layer configuration file is generated and stored on the local layer. FIG. 4 is a block diagram illustrating a rule-layer configuration file 400 for distributing rules among multiple layers of the system of FIG. 1, according to an illustrated embodiment.

The file 400 includes a directory data structure 410 that indicates a directory identification ("directory ID"). Ellipsis 419 indicates that the file 400 may include one or more other directory data structures. Each directory data structure 410 includes one or more resource data structures 422, 424 that each indicates a resource identification ("resource ID"). Ellipsis 429 indicates that directory data structure 410 may include one or more additional resource data structures. Each resource data structure 422, 424 includes a layer field 432, 434, respectively, that indicates a layer on which a rule is determined and executed. The layer indicated is for the resource indicated by the resource ID in the corresponding resource data structure. In the illustrated embodiment, the data in each layer field 432, 434 also indicates a type of rule applied. In the illustrated embodiment, two types of rules are defined: 1] a rule type that challenges a user for a user name and password, called herein an "auth" type; and 2] a rule type that does not challenge a user for a user name and password, called herein a "no_auth" type.

An example embodiment of a rule-layer configuration file is illustrated in Table 5. Different directory data structures, such as records in a file, are listed as different rows of Table 5. The directory IDs, resource IDs, and rule-type and layer field are listed as different columns in each record listed in Table 5. In the rule type and layer column of Table 5, the local layer is indicated by the string "local," the middle layer is indicated by the string "mid," and the database layer is indicated by the string "db." A "NULL" value in the resource ID indicates all resources stored in the corresponding directory use the same rule type and layer to determine responses to requests. The ellipses in the last row of Table 5 indicate one or more additional directory data structures in the example configuration file.

TABLE 5

Rule-layer configuration file for an illustrated embodiment.

| Directory ID | Resource ID | Rule type-layer indicator |
| --- | --- | --- |
| documentsT | NULL | auth_db |
| docs/documentsA | NULL | no_auth_local |
| sourcecode/Java | NULL | auth_mid |
| docs/documentsB | Cust.htm | auth_local |
| ... | ... | ... |

Based on the information in the configuration file, processes on the local and middle layers forward request information to the next layer in order from local layer, to one or more middle layers, if any, to database layer. According to the illustrated embodiment, during step 210, after receiving a request, the server determines the directory ID and resource ID of the resource requested and finds those values in the rule-layer configuration file. Depending on the type and layer associated with the resource, the server sends request information to another host (during steps 220 or 230), or determines the response internally. The server determines the response internally by skipping steps 220 through 240, executing the routine on the server during step 250, skipping step 260, and responding to the request during step 270.

For example, when the request for a web page in the documentsT directory is received by the application 130a of server 120a, the plug-in module 132a looks, within the example rule type-layer configuration file of Table 5, for the documentsT directory found in the URI of the request. The plug-in module then determines that the type-layer field associated with this directory has the value "auth_db." Based on this value, the plug-in module determines that the response is to be determined in a routine executed on the database layer, and that the database layer also does authentication of the user. In embodiments with a middle layer, during step 220, the plug-in module then passes the request information to the middle layer with the value of the type-layer field "auth_db." In response to receiving the request information and the type-layer field "auth_db," the broker host in the middle layer passes some or all of the request information on to the database layer, during steps 222 and 230. In response to receiving the request information and the type-layer filed "auth_db," the database layer challenges the user for a user ID and password, if that information is missing in the request information. The database server then selects a routine to execute based on the request information and the routine-selection table, and then invokes the selected routine, during step 240.

In another example, when a request for web page "Cust.htm" in the "docs/documentsB" directory is received by the application 130a of server 120a, the plug-in module 132a looks, within the example rule type-layer configuration file of Table 5, for the docs/documentsB directory found in the URI of the request and the "Cust.htm" file in the URL of the request. The plug-in module then determines that the type-layer field associated with this directory has the value "auth_local." Based on this value, the plug-in module determines that the response is to be determined internally in the plug-in module on the local layer, and that the local layer also does authentication of the user. The plug-in module skips steps 220 through 240, challenges the user for a user ID and password, executes a routine associated with the Cust.htm resource during step 250, skips step 260, and responds to the request during step 270.

In yet another example, when the request for a resource in the "sourcecode/Java" directory is received by the application 130a of server 120a, the plug-in module 132a looks, within the example rule type-layer configuration file of Table 5, for the "sourcecode/Java" directory found in the URI of the request. The plug-in module then determines that the type-layer field associated with this directory has the value "auth_mid." A middle layer is indicated for determining access to the Java source code. For purposes of illustration, it is assumed that the routine written to authorize access to the Java source code is written in Java and that the middle layer is configured with a Java virtual machine. Based on the value "auth_mid," the plug-in module determines that the response is to be determined in a routine executed on the broker, the middle layer, and that the broker also does authentication of the user. During step 220, the plug-in module then passes the request information to the middle layer with the value of the type-layer field "auth_mid." In response to receiving the request information and the type-layer field "auth_db," the broker host in the middle layer uses some or all of the request information, during step 222, and skips steps 230 and 240. The broker host challenges the user for a user ID and password, if that information is missing in the request information, during step 222. The broker then executes a Java routine to determine whether the user is to be granted access to the Java source code indicated in the URL and passed in the request information variable, filePath, during step 250.

If the resource and directory in the URL are not in the type-layer configuration file, a default rule type-layer is used. For purposes of illustration it is assumed that, if the resource is not found in the type-layer configuration file, the system behaves as if the resource does not exist at any of the servers. The appropriate response is readily determined in the plug-in module. Therefore, in the illustrated embodiment, the default rule-type is "no_auth_local." A response is generated internally on the server, which response indicates that the resource is not available, and the response is sent to the client, during steps 210, 250 and 270.

According to the embodiments described in this section, the rules for responding to requests are distributed over multiple layers of the organization's system of hosts.

Rules Administration Tool

As described above with respect to step 362 in FIG. 3, an administrator for the organization sometimes forms new rules to provide new behavior for responding to requests for resources. FIG. 5 is a flowchart illustrating at a high level a method 500 for administering rule-based responses to requests for resources with a user interface, according to an embodiment.

In step 510, a user interface is provided to the administrator. The user interface presents definitions for request information variables and access information variables. The user interface accepts a certain set of values for a particular set of request information variables, which set is used as a key to a table for automatic selection and invocation of the rule. In some embodiments, the user interface also accepts inputs from the administrator for a rule identification, such as a procedure name or package name or both, for a routine that provides the behavior for the rule. In some embodiments, the rule ID is generated automatically by the system. The user interface also accepts input from the administrator that is used as commands for deriving values of the access information variables from values of the request information variables. In some embodiments, the commands are formed based on user input using one or more pull down menus for indicating particular variables and particular operations. More details on the user interface are described for an illustrated embodiment below with reference to FIGS. 6A through 6E.

In step 520, inputs entered by the administrator through the user interface are accepted to express the rule.

In step 530, code is generated for a routine that provides the behavior of the rule based on the administrator's inputs. The routine code can be executed by a processor, such as a processor on the database server, to provide the behavior of the rule.

In step 540, the code is stored, for automatic retrieval and execution when request information is received that contains values for the particular set of request information variables used as a key for the rule. In an illustrated embodiment, the routine code is stored for retrieval by the rule ID. According to the embodiments illustrated above, the rule ID is placed in a routine-selection table of a database in the same row with the certain set of values for the particular set of request information used as a key.

FIG. 6A through FIG. 6E are block diagrams of windows of a user interface for an administrator to specify a rule for responding to requests for a resource, according to an embodiment.

Figure 6A:
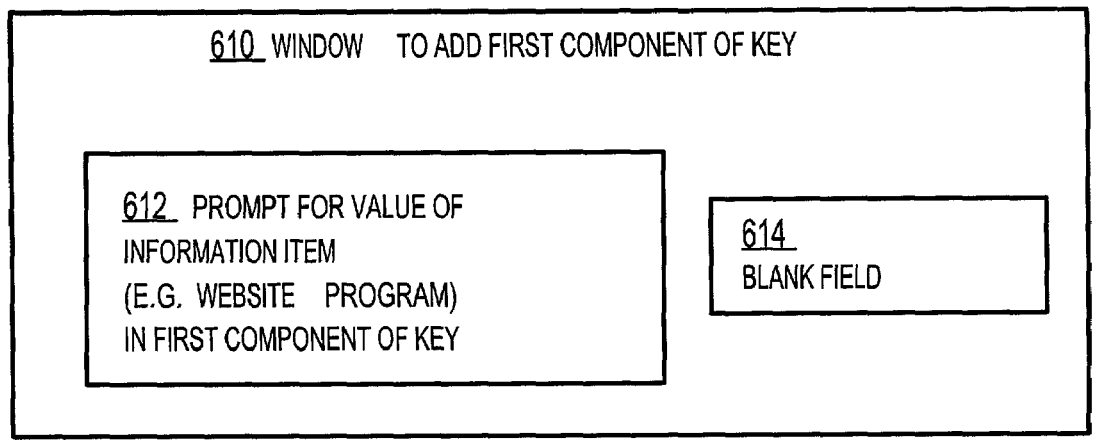
FIGS. 6A thru 6E are block diagrams of windows of a user interface for specifying a rule for responding to requests for a resource, according to an embodiment.

FIG. 6A is a block diagram illustrating a window 610 presented to an administrator for specifying a new value for a first component of a key used to select rules. The window 610 includes a prompt area 612 inviting an administrator to input a new value for the first component of a key to associate with the rule. For example, in the illustrated embodiment, a first component of the key is a web site name of multiple web sites hosted by the servers 120. In this embodiment, the prompt area 612 invites the administrator to input a name for a new web site hosted by the servers 120. The window 610 also includes a blank field 614 for receiving the administrator's input. During step 520, the administrator types into blank field 614 a value for a new web site to associate with the rule. For example, when the servers 120 begin hosting the OrgTechnical web site, after hosting the OrgMarketing web site for some time, the administrator uses a pointing device and keyboard to enter the value "OrgTechnical" into blank field 614.

Figure 6B:
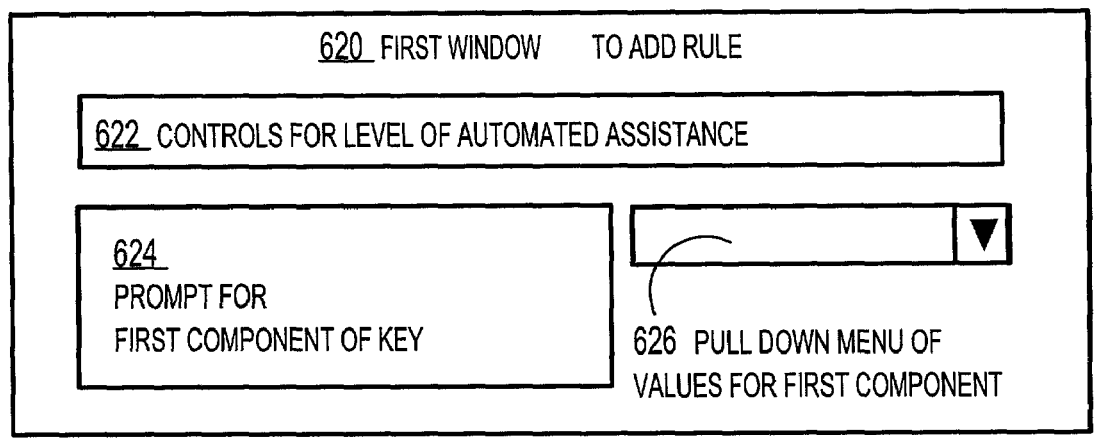

FIG. 6B is a block diagram illustrating a first window 620 presented to an administrator for adding a particular new rule. The window 620 includes a control area 622 holding controls for selecting a level of assistance for forming the new rule. The control area may include graphical objects that represent buttons, one or more pull down menus, or multiple links to other windows or web pages. Several levels of assistance may be offered in the control area 622. For example, for experienced administrators, a minimum level of assistance may be chosen that allows the administrator to derive values for access information variables using statements in a programming language, such as C, VisualBasic, Java, the standard query language (SQL), or a procedural language extension for SQL, such as PL/SQL available from the Oracle Corporation. In some embodiments, the control area 622 includes controls for selecting the programming language to be used.

For administrators without programming experience, a greater level of assistance may be chosen that automates the development of simple rules. Other levels of assistance that may be chosen in the control area 622 include revising existing templates for rules that apply commonly used logic. For example, in one embodiment, control area 622 includes a template for authentication by checking passwords associated with a user ID, a template for limiting access to a resource to a specified number of visits, a template for limiting access to a resource to a specified number of visits by an authenticated user, and a template for determining whether an authenticated user is among a specified user group. In an illustrated embodiment, during step 520, the administrator uses control area 622 to select the minimum level of assistance.

Window 620 also includes a prompt area 624 inviting an administrator to select a value among predefined values for the first component of the key to associate with the rule. The window also includes a pull down menu 626 of predefined values for the first key, which values were defined in visits to the window 610. For example, in the illustrated embodiment, during step 520, the administrator uses the pull down menu 626 to select one of the predefined values "OrgTechnical" and "OrgMarketing," for the first component of the key.

Figure 6C:
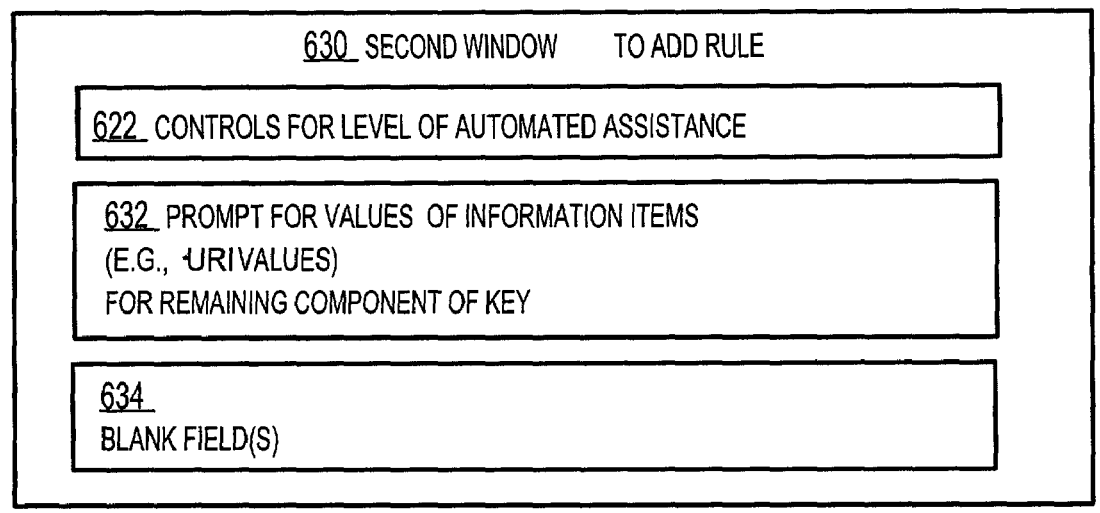

FIG. 6C is a block diagram illustrating a second window 630 presented to an administrator for adding a particular new rule. The window 620 includes the control area 622 holding controls for selecting a level of assistance for forming the new rule, so that the administrator may select a different level of assistance.

Window 630 also includes a prompt area 632 inviting an administrator to input one or more values for one or more sets of the one or more remaining components of the key to associate with the rule. Values for the remaining components of several keys may be entered. The window also includes blank fields 634 into which the administrator can insert the one or more values for the one or more sets of the remaining components of one or more keys.

For example, in the illustrated embodiment, a second component of the key is a directory name where the resource resides. In this embodiment, the prompt area 632 invites the administrator to input names for one or more directories where resources reside, which resources are to have response behaviors provided by the rule. During step 520, the administrator types into blank fields 634 a value for one or more directories to associate with the rule. For example, when RoutineB is created, the administrator types into one of the blank fields 634, the directory "/documentsT/". If the same rule applies to multiple directories, values for the other directories are typed into others of the blank fields 634.

Figure 6D:
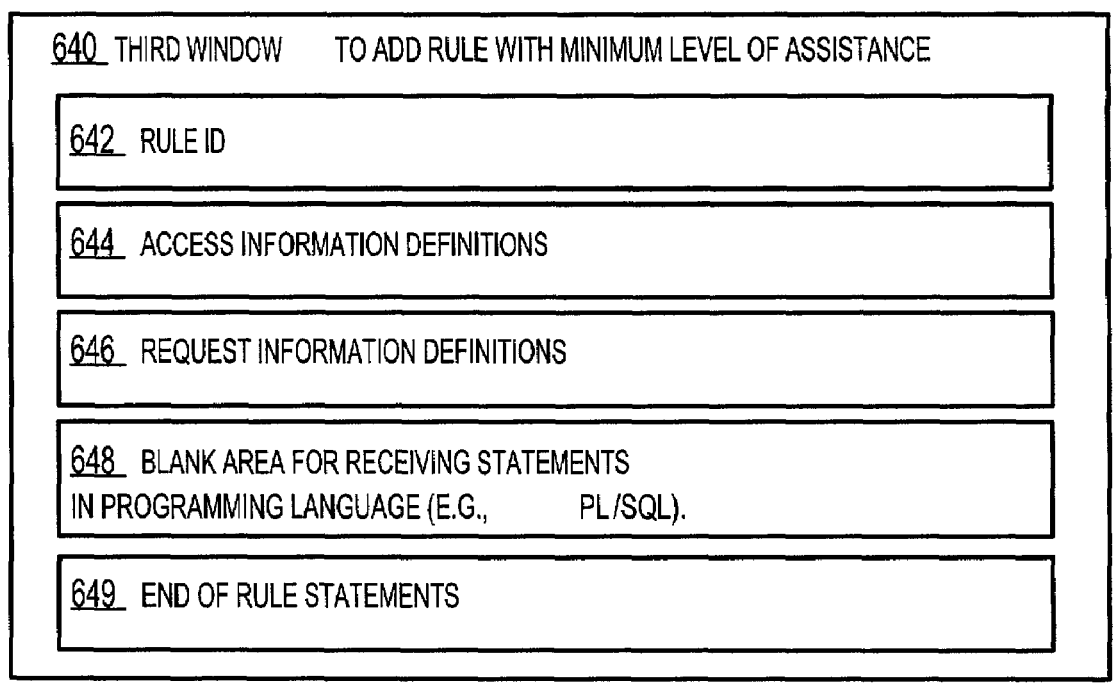

FIG. 6D is a block diagram illustrating a third window 640 presented to an administrator for adding a particular new rule, when the administrator has selected a minimum level of assistance. The window 640 includes a rule ID area 642 holding a rule ID for the new rule. In an illustrated embodiment, the rule ID is a procedure name or package name automatically generated by the system and includes data indicating the procedure or package belongs to the same database that holds the routine-selection table. In some embodiments, the administrator can revise the rule ID in area 642 during step 520.

The window 640 includes an access information definitions area 644 containing statements in the chosen programming language. The statements in area 644 define the access information variables, such as the variables listed in Table 1, that pass values back to a server so that the server may respond to the request. The window 640 also includes a request information definitions area 646 containing statements in the chosen programming language. The statements in area 646 define the request information variables, such as the variables listed in Table 3, that pass values to the routine so that the routine may derive values for the access information variables. The window 640 also includes an end-of-rule area 649 containing statements in the chosen programming language. The statements in area 649 terminate the routine and return values of the access information variables to a calling process for passing back to the server.

The window also includes a blank area 648 for receiving statements in the programming language that derive the values of the access information variables based on none, some, or all of the values of the request information variables. In an illustrated embodiment, during step 520, the administrator inserts into blank area 648 programming language statements that provide the behavior of RoutineB, described above, when the statements are coded for a processor and executed by that processor.

Figure 6E:
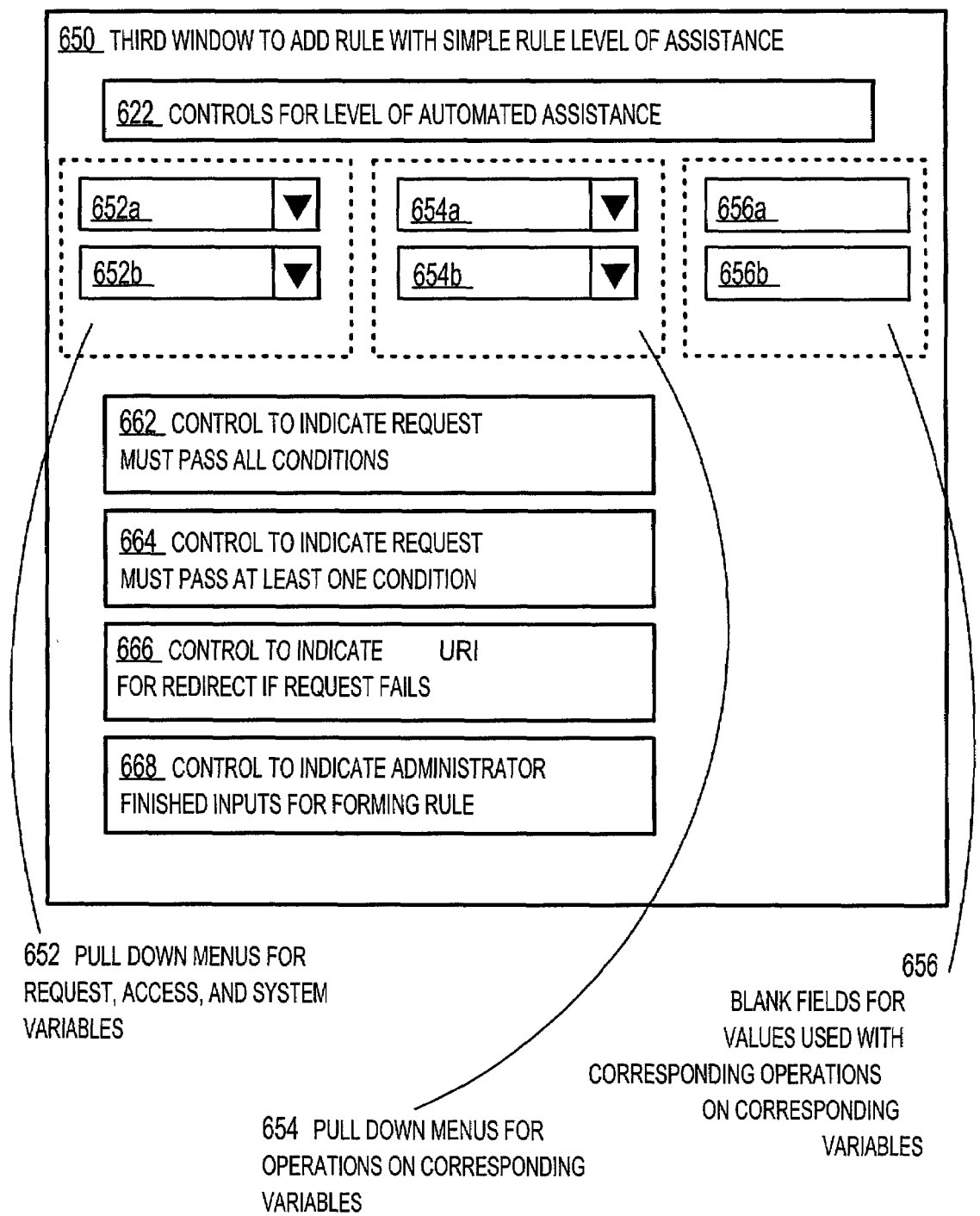

FIG. 6E is a block diagram illustrating a third window 650 presented to an administrator for adding a particular new rule, when the administrator has selected a level of assistance for a simple rule. An administrator navigates to the window 650 of FIG. 6E from the window of FIG. 6C by selecting the simple rule level of assistance in the control area 622.

Window 650 includes control area 622 for selecting a different level of assistance. The window 650 does not include a Rule ID area because a procedure name or package name that belongs to the same database that holds the routine-selection table is generated automatically by the system for the simple rule.

The window 650 includes multiple control areas for simply and easily specifying operations or conditions for determining whether to allow a client access to a resource or to redirect a client in response to a request from the client.

The window 650 includes an area 652 with one or more pull down menus, such as pull down menus 652*a*, 652*b*. Each pull down menu lists one or more variables, which the administrator can select for specifying logic for the rule. The variables listed in the pull down menu include at least some request information variables, such as listed in Table 3, and may include access information variables, such as listed in Table 1, and system variables such as variables that contain time and date information.

The window 650 includes an area 654 with one or more pull down menus, such as pull down menus 654*a*, 654*b*. Each pull down menu corresponds to a pull down menu in area 652 and lists one or more operators acting on the variable selected in the corresponding pull down menu. The administrator can select an operator for specifying logic, such as conditions or operations, for the rule. The operators listed in the pull down menu may include such operators as "equals," "does not equal," "contains," "does not contain," "starts with," "does not start with," "ends with," "does not end with," "is NULL," "is not NULL," "is less than," "is greater than," "is less than or equal to," and "is greater than or equal to," among others.

The window 650 includes an area 656 with one or more blank fields, such as blank fields 656*a*, 656*b*. Each blank field corresponds to a pull down menu in area 652 and a pull down menu in area 654. During step 520, the administrator may input data into the blank field that is used with the variable and operator selected in the corresponding pull down menus. During step 520, the administrator can use areas 652, 654 and 656 to specify one or more conditions for authorizing the client to access a requested resource.

The window 650 also includes control areas 662 and 664 for indicating, respectively, two potentially mutually exclusive requirements: that either 1] all conditions must be satisfied for the client to be allowed access to the requested resource; or 2] at least one condition must be satisfied for the client to be allowed access to the requested resource. For example, control areas 662, 664 are graphic elements representing radio buttons with labels stating, "User must pass all conditions," and "user must pass at least one condition," respectively. Clicking on one radio button selects the button and un-selects the other button.

The window 650 also includes a control area 666 for indicating a URL to which the client should be redirected if the requirements specified by control areas 662 or 664 are not met. For example, control area 666 includes a blank field with a label stating "If user does not meet criteria, redirect to:".

The window 650 also includes a control area 668 for indicating that the administrator is finished making entries into the window. For example, control area 668 is a graphical element representing a button that is labeled "OK."

In an illustrated embodiment, during step 520, the administrator operates the controls in window 650 to specify a rule that provides some simple behavior. During step 530, the system generates an automatically named routine with statements in a programming language based on these inputs, and the programming language statements of the named routine are then coded for the database processor. In some embodiments, the entries to control areas 652, 654, 6546, 662, 664, and 666 are also stored as a template so that the window 650 can be presented with old values for editing, if the administrator wants to modify an existing simple rule. During step 540, the code based on the routine is stored in the database, and the automatically generated name is stored in the routine-selection table. When the routine is selected and executed by the database server, the behavior of the rule is provided.

For purposes of illustrating a simple rule, it is assumed that access is granted to a requested resource unless the client is in the "Org.com" domain and the time is between 10 AM and 5 PM. If access is not granted, the client is redirected to a URL indicated by "Org.com/employees/TryAgain.htm." Assuming, for purposes of illustration, that the time is given by the system variable SystemTime, the rule amounts to granting access under the following conditions:

remoteHost does not contain "Org.com" OR
SystemTime is less than "10:00:00.000" OR
SystemTime is greater than "17:00:00.000;

and redirecting the client under other conditions.

To form such a rule, using window 650 of the interface, the administrator uses pull down menu 652*a* to select the request variable remoteHost, uses pull down menu 654*a* to select the operator "does not contain" and uses the blank field 656a to enter the value "Org.com." The administrator uses pull down menu 652b to select the system variable SystemTime, uses pull down menu 654b to select the operator "is less than" and uses the blank field 656b to enter the value "10:00:00.000." The administrator uses a third pull down menu in area 652 to select the system variable SystemTime, uses a third pull down menu in area 654 to select the operator "is greater than" and uses a third blank field in area 656 to enter the value "17:00:00.000." The administrator uses control area 664 to indicate the request must pass at least one condition, and uses a blank field in control area 666 to enter the value of the URL for redirection, "Org.com/employees/TryAgain.htm." Then the administrator uses control area 668 to indicate that the rule is complete.

Using the windows of FIGS. 6A through 6E, an administrator enters the information to form a rule that is automatically retrieved and executed by the system to form a response to a request for a resource.

Hardware Overview

Figure 7:
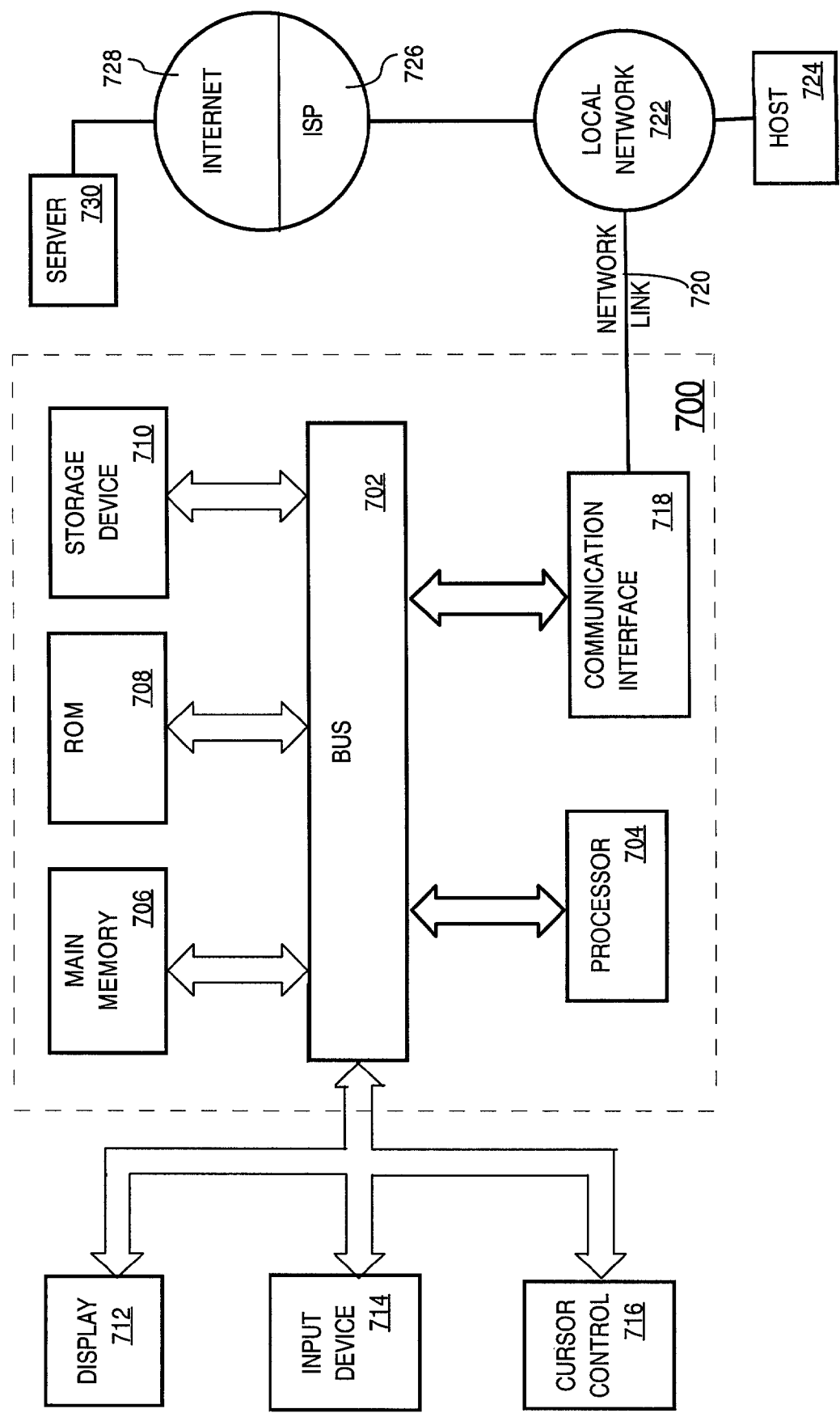
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for responding to a request for a resource on a network, the method comprising the steps of:
   receiving at a first server the request from a client process for the resource;
   transmitting from the first server a set of request information items associated with the request;
   in response to said transmitting, receiving at a database server at least a subset of the set of request information items, wherein the database server manages a database that stores, for each of a plurality of executable routines, one or more key values mapped to an identifier for each said routine;
   using, within the database server, at least one particular request information item of the subset to form a key value to identify a routine from among the plurality of executable routines, wherein each of the executable routines comprise executable code;
   executing code from the identified routine to generate a set of access information items; and
   responding to the request at the first server based on the set of access information items.

2. The method of claim 1 further comprising the step of passing at least one request information item from the set of request information items to the routine.

3. The method of claim 1 further comprising the steps of:
   receiving the set of request information items at a broker process on a host different from the first server and the database server;
   determining, at the broker process, the subset of the set of request information items to send to the database server; and
   sending the subset to the database server.

4. The method of claim 3, further comprising managing, at the broker process, a pool of one or more connections with the database server for sending the subset to the database server.

5. The method of claim 3, further comprising the step of performing, at the broker process, authentication of a user of the client process.

6. The method of claim 3, further comprising the step of performing, at the broker process, authentication of a user of the client process.

7. The method of claim 1, further comprising the step of responding to the request differently at the first server without taking the first server offline by changing the routine indicated within the database server.

8. The method of claim 1, wherein:
   the resource is one resource of a set of one or more resources; and
   the first server is one server of a plurality of servers that receive requests for any resource of the set of one or more resources.

9. The method of claim 8, further comprising the steps of:
   receiving the set of request information items at a broker process on a host different from the first server and the database server;
   determining, at the broker process, the subset of the set of request information items to send to the database server;
   for at least one resource of the set of one or more resources, sending the subset to the database server; and
   for at least a different resource of the set of one or more resources, using, at the broker process, at least one item of the set of request information items to identify the routine.

10. The method of claim 8, wherein:
    said step of transmitting the set of request information is performed for at least one resource of the set of one or more resources; and
    the method further comprises, for at least a different resource of the set of one or more resources, identifying the routine at the first server.

11. The method of claim 1, wherein:
    said step of executing the routine further comprises including data indicating authorization for the resource in the set of access information items; and
    said step of responding comprises providing the resource to the client.

12. The method of claim 1, wherein:
    said step of executing the routine further comprises including data indicating redirection to a second resource different from the resource in the set of access information items; and
    said step of responding comprises directing the client to the second resource.

13. The method of claim 1, wherein:
    said step of executing the routine further comprises including data indicating no authorization for the resource in the set of access information items; and
    said step of responding comprises not providing the resource to the client.

14. The method of claim 1, said step of receiving at the database server at least the subset of the set of request information items includes receiving data indicating a universal resource identifier (URI) for the resource.

15. The method of claim 14, said step of receiving at the database server at least the subset of the set of request information items includes receiving data distinguishing requests directed to different domain names received at the first server.

16. The method of claim 1, further comprising the step of performing, at the server, authentication of a user of the client process.

17. The method of claim 1, further comprising the step of performing, at the database server, authentication of a user of the client process.

18. The method of claim 1, further comprising
    storing at the first server data associating with each resource of a plurality of resources a corresponding host of the first server, the database server, and a broker that intercedes in communications between the server and the database server, the corresponding host for performing authentication of a user of the client process; and causing authentication to be performed at a particular host associated with the resource.

19. The method of claim 1, further comprising storing at the first server data associating with each resource of a plurality of resources a corresponding host of the server, the database server, and a broker that intercedes in communications between the server and the database server, the corresponding host for executing the routine; and causing the routine to be executed at a particular host associated with the resource.

20. The method of claim 1, wherein the database includes a table that has one or more columns containing, for each said routine, the one or more key values that are mapped to an identifier for each said routine.

21. The method of claim 1, wherein the plurality of executable routines are stored in the database.

22. The method of claim 1, further comprising, for a particular routine, changing at least one of the one or more key values mapped to an identifier for the particular routine.

23. The method of claim 1, further comprising, without taking the database server offline, changing executable code in a particular routine to change how a request having a particular set of request information items will be responded to.

24. The method of claim 1, further comprising, without taking the database server offline, changing the executable routine that is identified by a key value formed from a particular set of request information items to change how a request having the particular set of request information items will be responded to.

25. A computer-readable storage medium carrying one or more sequences of instructions for responding to a request for a resource on a network, wherein execution of the one or more sequences of instructions by one or more processors causes the one or more processors to perform the steps of:

receiving the request from a client process for the resource;

transmitting a set of request information items associated with the request;

in response to said transmitting, receiving a set of access information items that are determined by executing a routine identified, based on at least a portion of the request information items, from among a plurality of executable routines in a database managed by a databases server, wherein each of the executable routines comprise executable code, wherein the database stores, for each of a plurality of executable routines, one or more key values mapped to an identifier for each said routine, wherein the access information items includes an item that indicates whether to respond to the request with a resource other than the resource specified in the request; and responding to the request based on the set of access information items.

26. The computer-readable storage medium of claim 25, wherein execution of the one or more sequences of instructions further causes the one or more processors to perform the step of responding to the request differently without taking the server offline by changing the routine indicated within the database server.

27. The computer-readable storage medium of claim 25 wherein execution of the one or more sequences of instructions further causes the one or more processors to perform the steps of:

storing data associating with each resource of a plurality of resources a corresponding host of a request server for receiving the request, a database server for the database, and a broker that intercedes in communications between the request server and the database server, the corresponding host for performing authentication of a user of the client process; and causing authentication to be performed at a particular host associated with the resource.

28. The computer-readable storage medium of claim 25 wherein execution of the one or more sequences of instructions further causes the one or more processors to perform the steps of:

storing data associating with each resource of a plurality of resources a corresponding host of a request server for receiving the request, a database server for the database, and a broker that intercedes in communications between the request server and the database server, the corresponding host for executing the routine; and causing the routine to be executed at a particular host associated with the resource.

29. A computer-readable storage medium carrying one or more sequences of instructions for responding to a request for a resource on a network, wherein execution of the one or more sequences of instructions by one or more processors causes the one or more processors to perform the steps of:

receiving from a server a set of request information items associated with the request;

using at least one particular request information item of the set to form a key for retrieving data from a database object that is managed by a database server, wherein the data base object comprises, for each of a plurality of executable routines, one or more key values mapped to an identifier for each said executable routine;

wherein the retrieved data identifies a routine from among the plurality of executable routines; and wherein each of the executable routines comprise executable code;

executing code from the identified routine to generate a set of access information items; and sending the set of access information items to the server.

30. The computer-readable storage medium of claim 29, wherein execution of the one or more sequences of instructions further causes the one or more processors to perform the step of passing at least one request information item from the set of request information items to the routine.

31. A computer-readable storage medium carrying one or more sequences of instructions for responding to a request for a resource on a network, wherein execution of the one or more sequences of instructions by one or more processors causes the one or more processors to perform the steps of:

receiving from a server on a separate host a set of request information items associated with the request;

determining a subset of the set of request information items to send to a database server on another separate host, wherein the database server manages a database that stores, for each of a plurality of executable routines, one or more key values mapped to an identifier for each said routine, and wherein at least one particular request information item of the subset is usable form a key to identify a routine of the plurality of executable routines;

sending the subset to the database server;

in response to said sending, receiving a set of access information items that are determined by executing a routine identified from among a plurality of executable routines in a database on the database server, wherein each of the executable routines comprise executable code, and wherein the routine is identified based on the key; and causing the server to respond to the request based on the set of access information items.

32. The computer-readable storage medium of claim 31, wherein execution of the one or more sequences of instructions further causes the one or more processors to perform the step of managing a pool of one or more connections with the database server for sending the subset to the database server.

33. The computer-readable storage medium of claim 31, wherein execution of the one or more sequences of instructions further causes the one or more processors to perform the step of performing authentication of a user of the client process.

34. A system for responding to a request for a resource on a network, comprising:
  a network;
  a server connected to the network, the server comprising:
    one or more server processors; and
    a first computer-readable storage medium carrying a first set of one or more sequences of instructions, wherein execution of the first set by the one or more server processors causes the one or more server processors to perform the steps of
      receiving the request from a client process for the resource,
      transmitting a set of request information items associated with the request,
      in response to said transmitting, receiving a set of access information items, and
      responding to the request based on the set of access information items; and
  a database server connected to the network, the database server comprising one or more database processors; and
    a second computer-readable storage medium carrying a second set of one or more sequences of instructions, wherein execution of the second set by the one or more database processors causes the one or more database processors to perform the steps of
      receiving the set of request information items;
      using at least one particular request information item of the set to form a key for retrieving data from a database object that is managed by a database server,
      wherein the data base object comprises, for each of a plurality of executable routines, one or more key values mapped to an identifier for each said executable routine;
      wherein the retrieved data identifies a routine from among the plurality of executable routines; and
      wherein each of the executable routines comprise executable code;
      causing code from the identified routine to be executed to generate the set of access information items; and
      causing the set of access information items to be sent to the server.

35. The system of claim 34, further comprising:
a broker connected to the network, the broker comprising:
  one or more broker processors; and
  a third computer-readable storage medium carrying a third set of one or more sequences of instructions, wherein execution of the third set by the one or more broker processors causes the one or more broker processors to perform the steps of
    receiving from the server the set of request information items;
    determining a subset of the set of request information items to send to the database server;
    sending the subset to the database server;
    in response to sending the subset, receiving the set of access information items; and
    sending to the server the set of access information items.

* * * * *

UNITED STATES PATENT AND TRADEMARK OFFICE
CERTIFICATE OF CORRECTION

PATENT NO. : 7,243,138 B1 Page 1 of 1
APPLICATION NO. : 10/146335
DATED : July 10, 2007
INVENTOR(S) : Keith Majkut et al.

It is certified that error appears in the above-identified patent and that said Letters Patent is hereby corrected as shown below:

Please delete at Column 25, line 63:

6. The method of claim 3, further comprising the step of performing, at the broker process, authentication of a user of the client process.

Signed and Sealed this

Twentieth Day of November, 2007

JON W. DUDAS
*Director of the United States Patent and Trademark Office*